United States Patent
Ebrahimi Afrouzi (10) Patent No.: US 11,884,485 B1
(45) Date of Patent: *Jan. 30, 2024

(54) AUTONOMOUS REFUSE CONTAINER

(71) Applicant: Ali Ebrahimi Afrouzi, San Diego, CA (US)

(72) Inventor: Ali Ebrahimi Afrouzi, San Diego, CA (US)

(73) Assignee: AI Incorporated, Toronto (CA)

( * ) Notice: Subject to any disclaimer, the term of this patent is extended or adjusted under 35 U.S.C. 154(b) by 206 days.

This patent is subject to a terminal disclaimer.

(21) Appl. No.: 17/392,228

(22) Filed: Aug. 2, 2021

Related U.S. Application Data (63) Continuation of application No. 16/129,757, filed on Sep. 12, 2018, now abandoned.

(60) Provisional application No. 62/558,280, filed on Sep. 13, 2017.

(51) Int. Cl.
*B65F 1/14* (2006.01)
*G05D 1/02* (2020.01)
*B65F 1/16* (2006.01)

(52) U.S. Cl.
CPC .............. *B65F 1/1473* (2013.01); *B65F 1/16* (2013.01); *G05D 1/0221* (2013.01); *B65F 2210/128* (2013.01); *B65F 2210/138* (2013.01); *B65F 2210/1443* (2013.01); *B65F 2210/165* (2013.01); *B65F 2210/168* (2013.01)

(58) Field of Classification Search
None
See application file for complete search history.

(56) References Cited

U.S. PATENT DOCUMENTS

| | | | |
|---|---|---|---|
| 9,235,218 B2 * | 1/2016 | Levien | F41G 7/2206 |
| 10,286,558 B1 * | 5/2019 | Asada | B25J 13/003 |
| 2008/0109114 A1 * | 5/2008 | Orita | B25J 19/005 |
| | | | 901/50 |
| 2008/0140253 A1 * | 6/2008 | Brown | B65F 1/1638 |
| | | | 701/23 |
| 2015/0031343 A1 * | 1/2015 | Mamlyuk | H04W 4/02 |
| | | | 455/414.1 |
| 2017/0174427 A1 * | 6/2017 | Wagner | B65F 1/1468 |
| 2018/0035606 A1 * | 2/2018 | Burdoucci | A01D 34/84 |
| 2018/0060765 A1 * | 3/2018 | Hance | B65G 57/02 |
| 2018/0074511 A1 * | 3/2018 | Rodoni | B65F 3/02 |
| 2018/0079591 A1 * | 3/2018 | Doty | B65F 3/00 |
| 2018/0164828 A1 * | 6/2018 | Dumitras | G01G 19/52 |
| 2018/0286250 A1 * | 10/2018 | Cronin | G05D 1/028 |
| 2019/0025838 A1 * | 1/2019 | Artes | G05D 1/0274 |
| 2019/0352090 A1 * | 11/2019 | Mallady | B62B 3/0612 |

FOREIGN PATENT DOCUMENTS

| | | | | | |
|---|---|---|---|---|---|
| FR | 2610306 A | * | 8/1988 | ........... | B08B 9/0826 |
| GB | 2410177 A | * | 7/2005 | ........... | B08B 9/0826 |
| TW | 297934 U | * | 9/2006 | | |
| WO | WO-0026829 A1 | * | 5/2000 | .............. | G06F 3/011 |

* cited by examiner

*Primary Examiner* — Daniel L Greene (57) ABSTRACT

An autonomous mobile robotic refuse container device that transports itself from a storage location to a refuse collection location and back to the storage location after collection of the refuse. When it is time for refuse collection, the robotic device autonomously navigates from the refuse container storage location to the refuse collection location. Once the refuse within the container has been collected, the robotic device autonomously navigates back to the refuse container storage location.

19 Claims, 7 Drawing Sheets

AUTONOMOUS REFUSE CONTAINER

CROSS-REFERENCE TO RELATED APPLICATIONS

This application is a Continuation of U.S. Non-Provisional patent application Ser. No. 16/129,757, filed Sep. 12, 2018, which claims the benefit of Provisional Patent Application No. 62/558,280. In this patent, certain U.S. patents, U.S. patent applications, or other materials (e.g.) articles) have been incorporated by reference. Specifically, U.S. Application Nos. 62/616,669, Ser. Nos. 16/051,328, 15/272,752, 62/661,802, 62/631,050, Ser. Nos. 15/951,096, and 15/447,450 are hereby incorporated by reference. The text of such U.S. Patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The present invention relates to robotic devices in general, and more particularly to mobile robotic devices that handle waste.

BACKGROUND

Mobile robotic devices are becoming increasingly common in consumer homes and commercial spaces. In several instances, mobile robotic devices are desirable for the convenience they provide to a user. For example, mobile robotic devices may be used in waste management to provide a convenience to users as a large amount of refuse is accumulated on a daily basis, the refuse including but not limited to trash, yard waste, recyclable materials, and the like. The refuse is often accumulated in bins that are transferred to a refuse collection location by the user. This may be inconvenient and/or unsatisfying for the user as waste management requires user intervention and handling of the bins may be unsanitary. A mobile robotic device that may autonomously manage the refuse of a user is therefore desirable.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

The present invention proposes a mobile robotic comprising a chassis including a set of wheels, a motor for driving the set of wheels, a suspension system, a rechargeable battery for providing power to the device, a control system module for controlling the movement of the device, a processor, a set of sensors, a container for storing refuse, and a lid for keeping refuse stored within the device.

Embodiments of the present invention introduce a device that autonomously transports a refuse bin from a storage location of the refuse bin to a refuse collection location and back to the storage location of the refuse bin after collection of the refuse.

BRIEF DESCRIPTION OF THE DRAWINGS

Non-limiting and non-exhaustive features of the present invention are described and depicted with reference to the following figures, wherein like reference numerals refer to like parts throughout the various figures.

DETAILED DESCRIPTION OF THE INVENTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that include a computer-readable medium on which computer-readable instructions for carrying out embodiments of the inventive technique are stored. The computer-readable medium may include semiconductor, magnetic, opto-magnetic, optical, or other forms of computer-readable medium for storing computer-readable code. Further, the invention may also cover apparatuses for practicing embodiments of the invention. Such apparatus may include circuits, dedicated and/or programmable, to carry out tasks pertaining to embodiments of the invention. Examples of such apparatus include a computer and/or a dedicated computing device when appropriately programmed and may include a combination of a computer/computing device and dedicated/programmable circuits adapted for the various tasks pertaining to embodiments of the invention.

As understood herein, the term "robot", "device" or "robotic device" may be defined generally to include one or more autonomous devices having communication, mobility, and/or processing elements. For example, a robot or robotic device may comprise, but is not limited to, a casing or shell, a chassis including a set of wheels, a motor to drive wheels, a receiver that acquires signals transmitted from, for example, a transmitting beacon, a transmitter that transmits signals, a processor, and/or controller that processes and/or controls the motor and other autonomous robotic function and/or operations, network or wireless communications, power management, etc., and one or more clock or synchronizing devices.

As understood herein, the term "refuse" may be defined generally to include any type of waste including but not limited to trash, recyclable materials, yard waste, compost and the like.

As understood herein, the term "user" or "users" may be defined generally to include any entity that utilizes the mobile robotic device including humans, other mobile robotic devices, control systems, and the like.

The present invention proposes embodiments of an autonomous mobile robotic device that may hold and/or transport refuse. The robotic device may comprise, but is not limited to, a set of wheels, a power source, a chassis, a suspension system, a rechargeable battery, a control module, a processor, a container for holding refuse, a lid for containing refuse within the container and the like. In some embodiments, the robotic device may further comprise a mapping module for mapping the environment using mapping techniques such as SLAM, and mapping tools such as imaging devices, sonar devices, LIDAR and LADAR devices, structured light devices, stereo vision and the like. In some embodiments, the robotic device may further comprise a localization module. Cameras, LIDAR, LADAR, stereo imaging, signal detectors and receivers, gyroscope, optical encoder, optical flow sensor, depth sensors and other devices may be used to capture information that the processor of the robotic device may use to localize itself within an internal map of the working environment. In some embodiments, the processor of the robotic device may use machine learning techniques to learn the most optimal route for transporting the refuse container from a storage location of the refuse container to a refuse collection location and back to its storage location. Various observations may be collected during operation in order to determine the most optimal path for the robotic device when transporting the refuse back and forth between the storage and collection location. For example, observations such as number of collisions, travel time, number of stalls, and travel distance may be used in determining the most optimal path. In some embodiments, the robotic device may have a wireless module to wirelessly send and receive information, such as a Wi-Fi module, a Bluetooth module, a RF module and the like. In some embodiments, the robotic device may comprise a scheduling module for, for example, setting a schedule for transportation of the refuse to the refuse collection location. This may include the day, time, frequency, duration of time for remaining at the refuse collection location, and the like.

Figure 1:
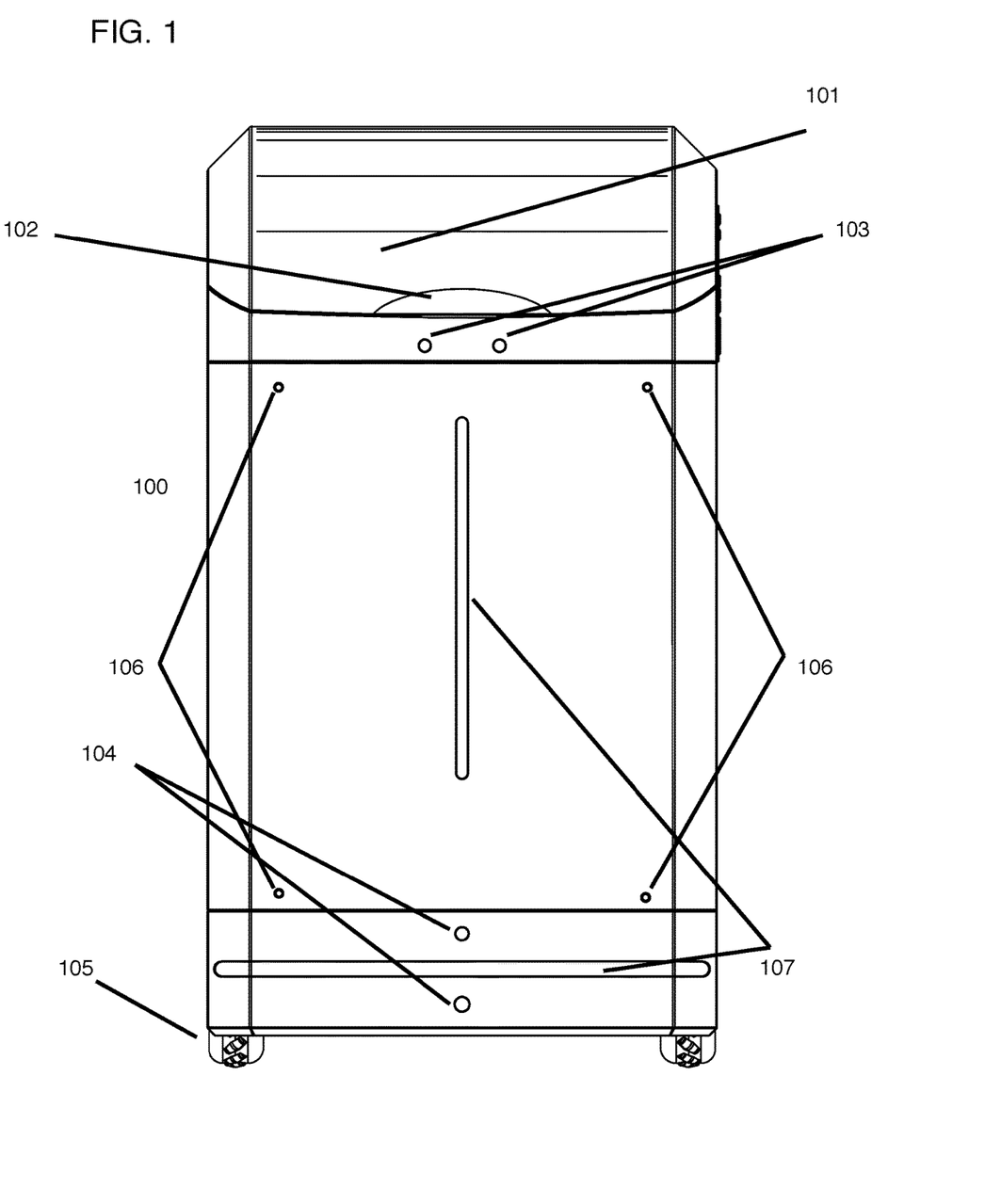
FIG. 1 illustrates embodiments of the present invention displaying a front view of a robotic device.

FIG. 1 illustrates robotic device 100. Lid 101 of robotic device 100 may be physically opened using front handle 102. In some embodiments, a user may physically open the container by opening the lid. In some embodiments, the device may be given a command by, for example, a user or control system to open the lid. Stereo vision cameras 103 are located on an upper portion of robotic device 100 for the purpose of mapping the environment. Sensor arrays 107 are positioned in the middle and at a lower portion of the front of robotic device 100. As robotic device 100 operates and/or traverses the work environment, stereo vision cameras 107 may continuously collect data that may be used by a processor of robotic device 100 to generate a map of the environment. Depth sensors 104 are located on a lower portion of robotic device 100. Wheels 105 of robotic device 100 may be, for example, mecanum wheels. Time of Flight (TOF) sensors 106 are positioned on the front corners of robotic device 100 and may be used to observe the depth of obstacles within the environment.

Figure 2:
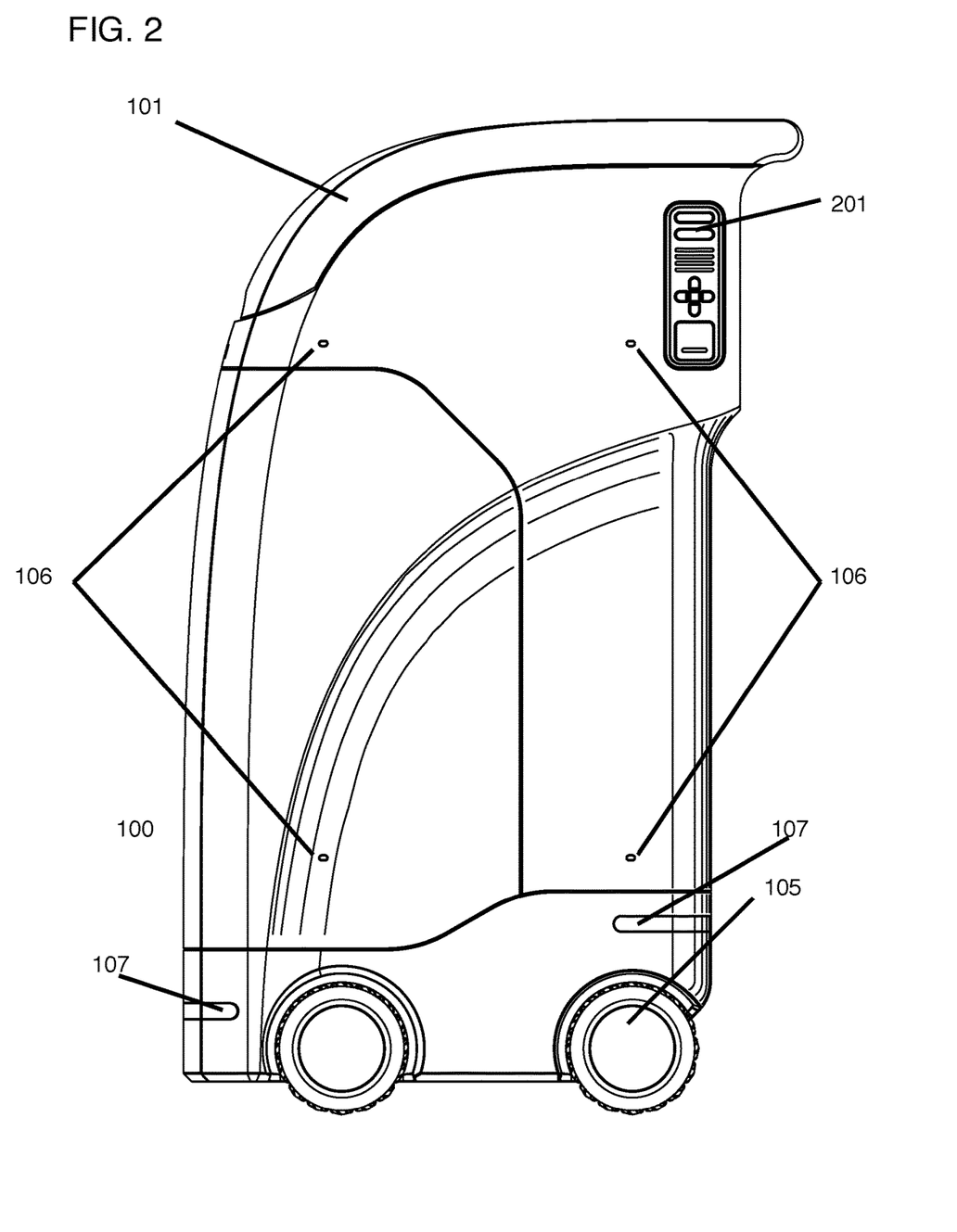
FIG. 2 illustrates embodiments of the present invention displaying a side view of a robotic device.

FIG. 2 illustrates a side view of robotic device 100 with internal refuse container (not shown) and lid 101. Controller 201 may be provide commands to robotic device 100, such as operational commands, movement commands, and the like. Sensor arrays 107 are positioned at lower front and rear portions of robotic device 100 while wheels 105 are positioned at the bottom of robotic device 100. TOF sensors 106 are strategically positioned on the corners of the sides of robotic device 100 to monitor obstacles.

Figure 3:
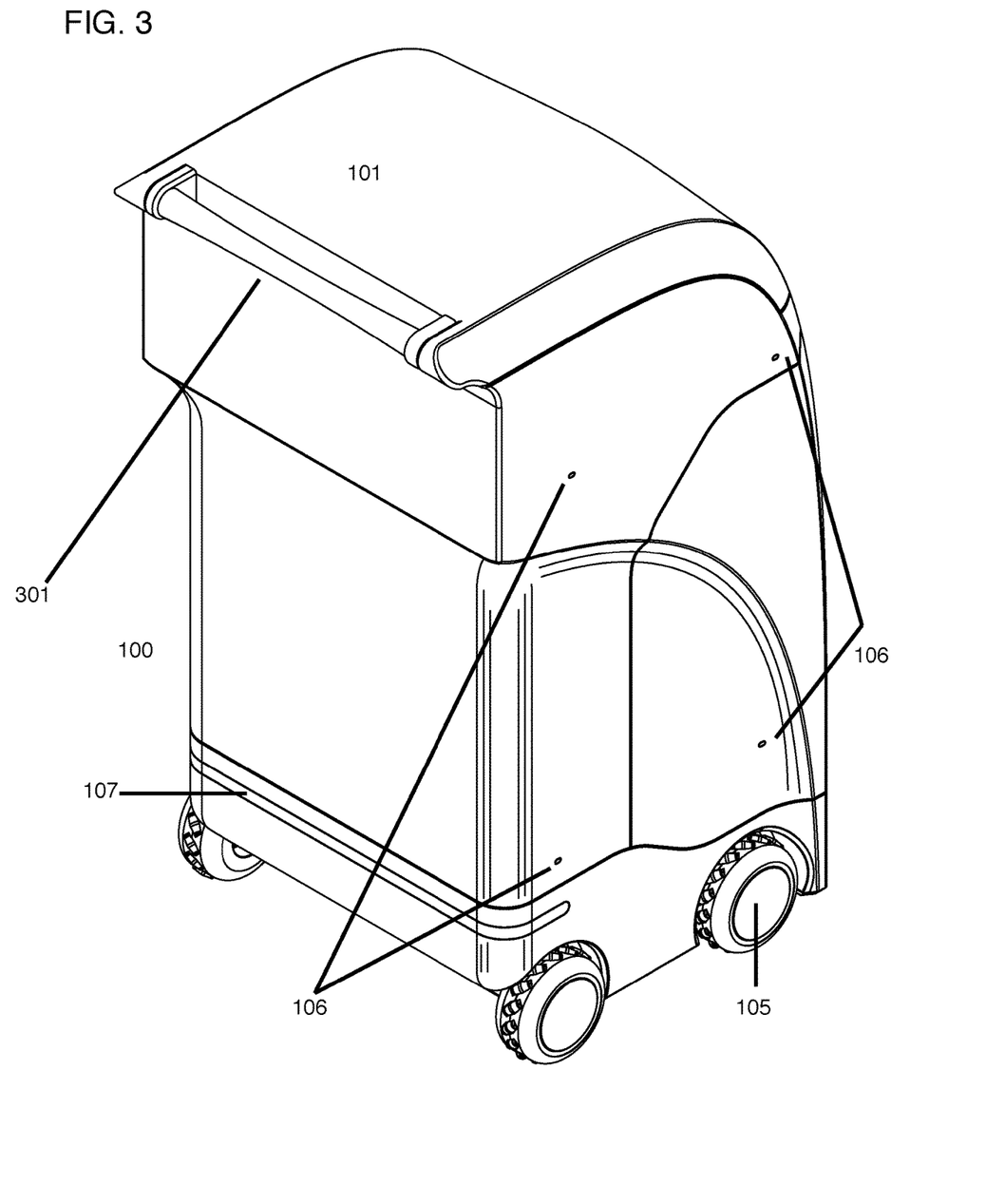
FIG. 3 illustrates embodiments of the present invention displaying a rear view of a robotic device.

FIG. 3 illustrates a perspective view of robotic device 100 with internal refuse container (not shown) and lid 101. Handle 301 may be used for physically wheeling and directing the movement of robotic device 100. Sensor array 107 is positioned on a lower rear portion of robotic device 100 while wheels 105 are positioned at the bottom. TOF sensors 106 are strategically positioned on the corners of robotic device 100.

In embodiments, a container of the robotic device may be used for storing and/or transporting refuse. In some instances, the robotic device may be stored in at least one specific location and refuse may be deposited into the container by, for example, a user or another robotic device. In some embodiments, the refuse within the container is collected from at least one predetermined refuse collection location at least one predetermined date and time that may or may not be recurring on a, for example, weekly or bi-weekly basis. For example, at corporate establishments and/or consumer homes refuse contained within a refuse container is often collected on a recurring weekly or bi-weekly basis. In some embodiments, the robotic device will autonomously transport the refuse contained within the refuse container of the robotic device to a predetermined refuse collection location at a predetermined date and time for refuse collection. After collection of the refuse, the robotic device may autonomously navigate back to a designated storage location. In some embodiments, scheduling information for refuse collection may be provided to the processor of the robotic device using a mobile communication device with graphical user interface, remote control, a user interface on the robotic device, or another type of device that may communicate with the processor of the robotic device. For example, a graphical user interface such as that described in U.S. patent application Ser. Nos. 15/272,752, 62/631,050, and 62/661,802, the entirety of which are hereby incorporated by reference, may be used for entering scheduling information. Further, an example of a method for providing scheduling information to a robotic device is described in U.S. patent application Ser. No. 16/051,328, the entirety of which are hereby incorporated by reference.

In some embodiments, the robotic device may comprise a mobile robotic platform that may support and autonomously transport static refuse containers supported by the platform back and forth between at least one refuse container storage location to at least one refuse collection location. In some embodiments, the mobile robotic platform may comprise a locking mechanism for the refuse container.

In embodiments, the processor of the robotic device may learn a path, such as a path between a refuse container storage location and a refuse collection location, in a variety of ways. In some embodiments, the robotic device may be taught a path by directing the robotic device along the desired path by physically moving the robotic device or by using a remote control or an application of a communication device paired with the robotic device. Other methods of moving the robotic device along the desired path may also be used. For example, the robotic device may be taught a path between the refuse container storage location and refuse collection location by physically wheeling the robotic device from the storage location, through the environment, to the refuse collection location. In some embodiments path learning may be initiated by, for example, a user pressing a start button on the robotic device or on any other device capable of communicating with the robotic device, voice activation or autonomously upon startup, prior to beginning the process of teaching a path to a processor of the robotic device. In some embodiments, path learning may be completed by, for example, pressing an end button on the robotic device or on any other device capable of communicating with the robotic device, voice activation, or autonomously upon detecting no movement of the robotic device. Path learning may be initiated when the robotic device is positioned at a storage location of the refuse container and completed after the robotic device has navigated along the desired path and returned back to the storage location or any other storage location. In some embodiments, path learning may be initiated when the robotic device is positioned at a storage location of the refuse container and completed after the robotic device has navigated along the desired path to a refuse collection location. Alternatively, in some embodiments, path learning may be initiated and completed using an application of a communication device, such as a mobile device, laptop or smart phone, capable of communicating with the robotic device. In some embodiments, an application of a communication device may be used to mark a path of the robotic device within a map of the working environment that may be shared with the robotic device. During path learning, the processor of the robotic device may determine its location within an internal map of the working environment while simultaneously mapping the environment. In some instance, the processor of the robotic device may mark observed obstacles in the working environment within an internal map of the environment.

In some embodiments, a memory of the robotic device may contain an internal database of obstacles likely to be encountered within the working environment. In embodiments, an obstacle encountered in the work environment may be identified using various sensors to capture features of the obstacle and the processor to determine the type of obstacle based on the internal database. The processor of the robotic device may note the increased likelihood of that type of obstacle being located in the region of the environment in which it was encountered. For example, if a robotic device encounters a hose on the ground, image sensors of the robotic device may capture features of the hose and the processor may determine it is a hose based on an internal database of obstacles and their features. The processor of the robotic device may mark the region in which the hose was encountered within an internal map as a region with increased likelihood of containing a hose. In some embodiments, the processor may further determine if an obstacle may be overcome by the robotic device. For example, the processor may determine if the hose is an obstacle that may be overcome by the robotic device by driving over the hose. If so, the robotic device may attempt to drive over the obstacle. If, however, the robotic device encounters a large obstacle, such as a planter, the processor may determine that it cannot overcome the obstacle and may attempt to maneuver around the obstacle. In some embodiments, regions wherein obstacles are consistently encountered may be classified by the processor of the robotic device as a high traffic area and may be marked in a map of the environment. In some embodiments, the processor of the robotic device may attempt to alter its path in order to avoid high traffic areas.

In embodiments, the processor of the robotic device may generate multiple maps of the working environment over multiple working sessions. The maps may be stored in a memory of the robotic device and may be combined with previously generated maps using a processor of the robotic device to keep the map of the working environment up to date. In some embodiments, a predetermined map of the working environment may be generated and stored in an internal memory of the robotic device. In some embodiments, the robotic device may generate a map of the working environment during operation in the working environment. In embodiments, the processor of the robotic device may update the internal map of the working environment with the observations collected during each successive work session. Continuous updates to the map of the working environment may help establish the most efficient path of the robotic device.

In some embodiments, the robotic device may alert the user when an unanticipated obstacle blocking the path of the robotic device is encountered, particularly when the robotic device may not overcome the obstacle by maneuvering around or driving over the obstacle. The robotic device may alert the user by generating a noise, sending a message to an application of a communication device paired with the robotic device or any other device paired with the robotic device, displaying a message on a screen of the robotic device, illuminating lights, and the like.

Figure 4A:
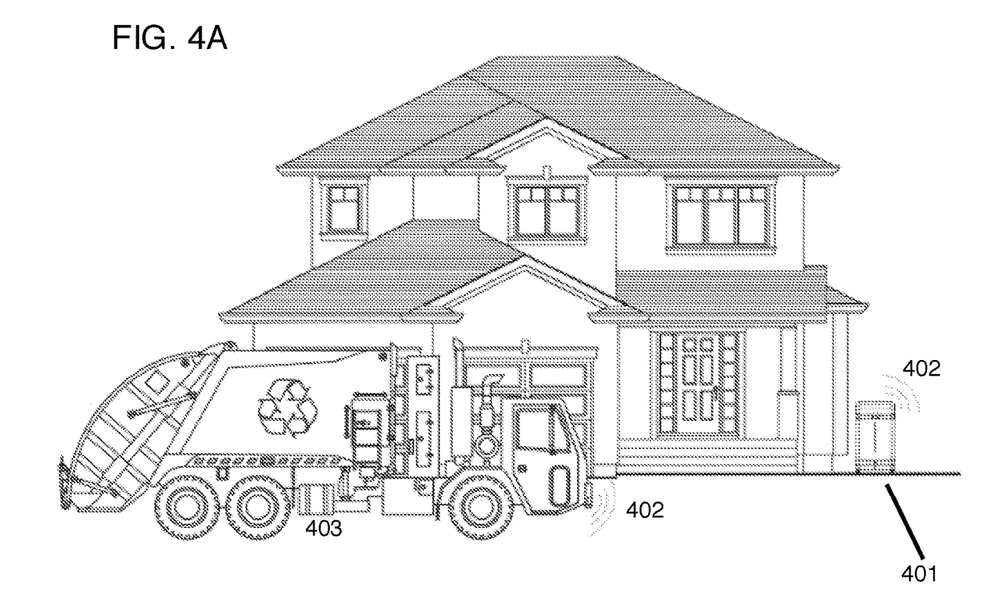
FIG. 4A-4E illustrate an example of steps that may be taken by an entity responsible for the collection of refuse from refuse containers of robotic devices.
Figure 4B:
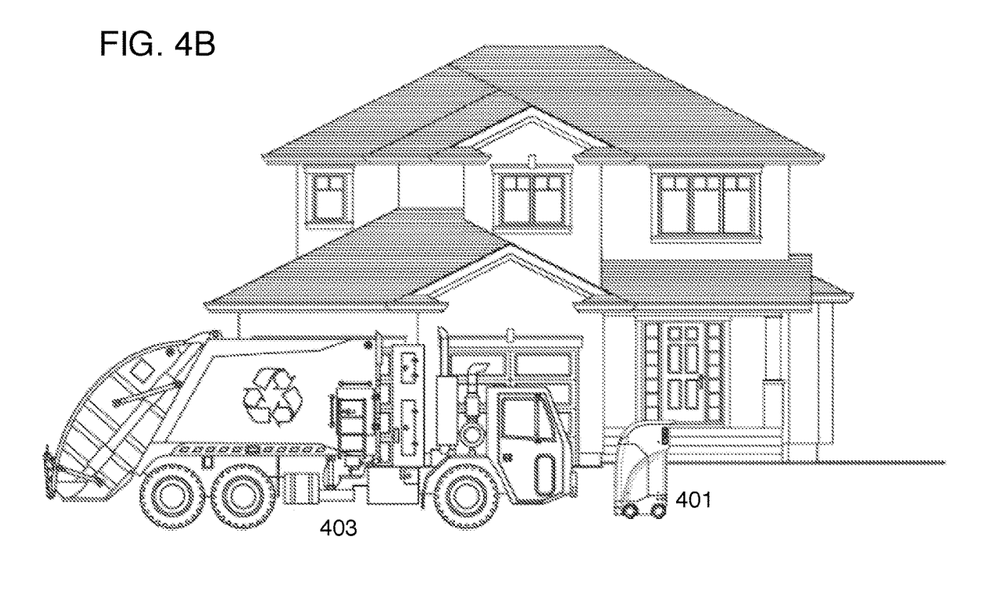
Figure 4C:
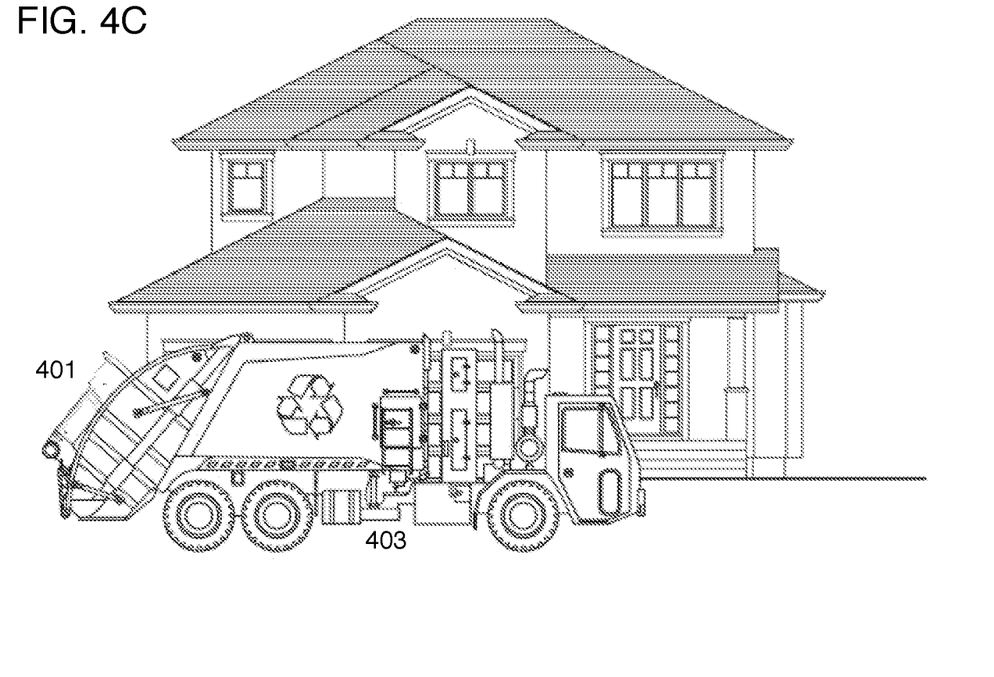
Figure 4D:
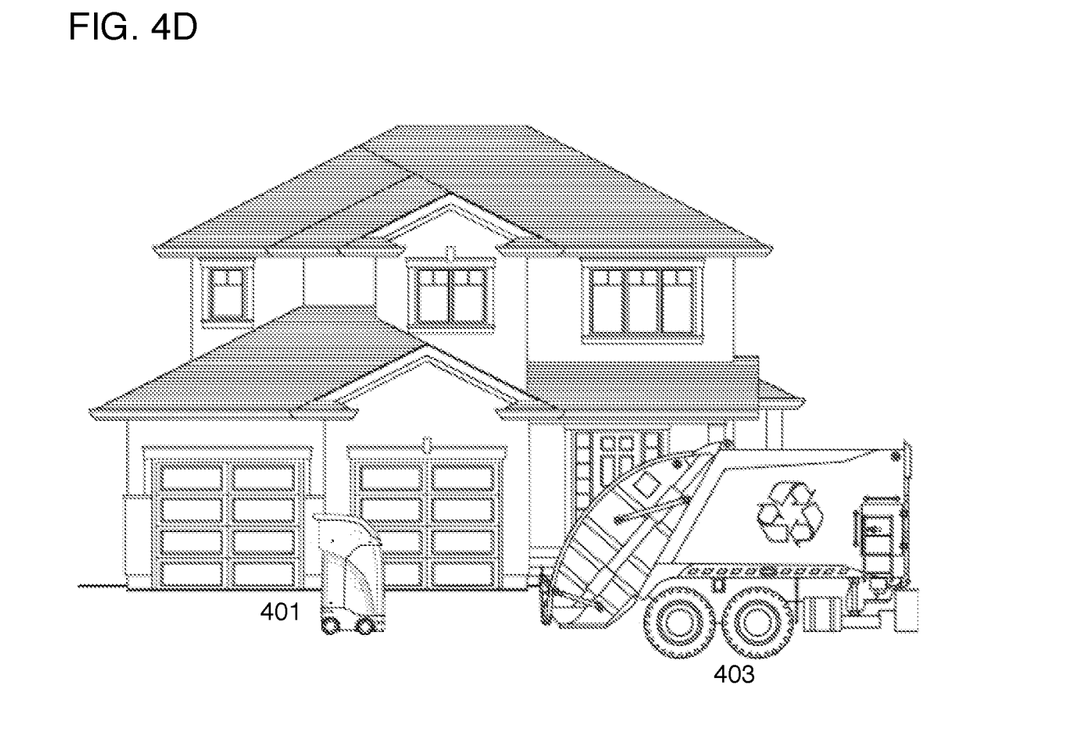
Figure 4E:
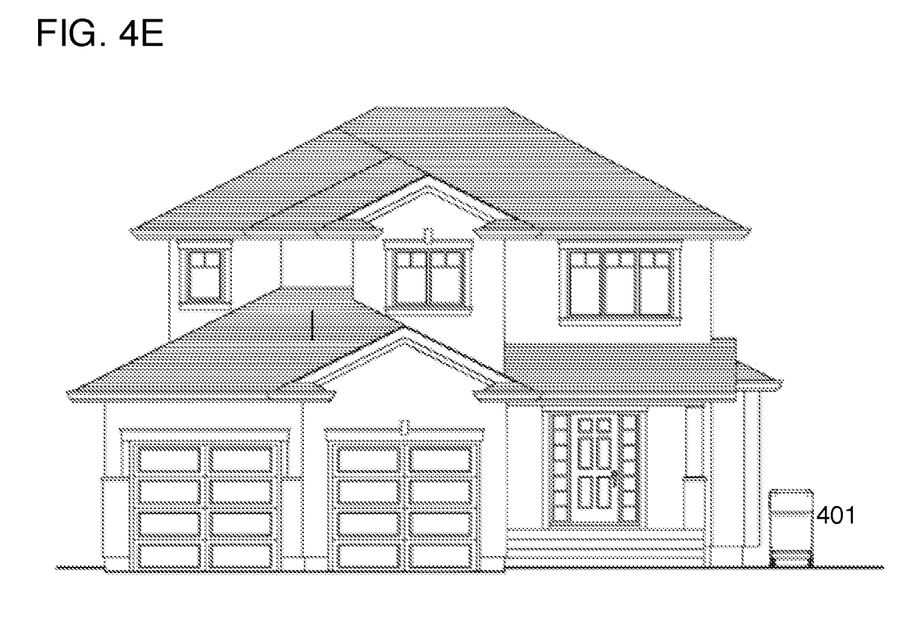

In some embodiments, the entity responsible for managing the collection of refuse may transmit a signal to a receiver of the robotic device to notify the processor of the robotic device of the day and time of refuse collection and/or the location of refuse collection. In some embodiments, a signal received by the receiver may indicate immediate transport of the refuse container to the refuse collection location. The signal may be a Wi-Fi signal, Bluetooth signal, RF signal, or other types of wireless signals. In some embodiments, a refuse collection vehicle, such as a refuse collection truck, may broadcast a signal to refuse-storing mobile robotic devices within the same region as the refuse collection vehicle, notifying the mobile robotic devices that it is time for refuse collection at which point each mobile robotic device within the area may navigate to their respective refuse collection location. Once the refuse has been collected by the refuse collection vehicle, the refuse collection vehicle may broadcast another signal to notify the robotic devices that may navigate back to their respective refuse container storage location. Alternatively, in some embodiments, a barcode or other type of identification tag located on the robotic device may be scanned by a scanner of the refuse collection vehicle after refuse collection to alert the robotic device that it may navigate back to the refuse container storage location. In other embodiments, other methods of alerting the robotic device that refuse collection is complete and that it may navigate back to the refuse container storage location may be used, such as, voice activation or activating a button on an interface of the robotic device. In some embodiments, the entity responsible for managing the collection of refuse may monitor the location of the refuse collection vehicle in real-time. When the refuse collection vehicle reaches within a predetermined range of the refuse-storing mobile robotic device, the entity may send a signal via Wi-Fi, Bluetooth, RF, or the like, to the refuse storing robotic device, notifying the robotic device that it is time for refuse collection, at which point the robotic device may navigate to the refuse collection location. When the refuse collection vehicle reaches outside a predetermined range of the refuse-storing mobile robotic device, the entity may send a signal via Wi-Fi, Bluetooth, RF, or the like, to the refuse storing robotic device, notifying the robotic device that refuse collection is complete, at which point the robotic device may navigate back to the refuse container storage location. In some embodiments, the refuse collection vehicle and/or the entity responsible for managing the collection of refuse may send refuse collection schedule to the refuse-storing robotic devices via Wi-Fi, Bluetooth, RF, or the like. In some embodiments, the robotic device may transmit a signal to the refuse collection vehicle and/or the entity responsible for managing the collection of refuse via Wi-Fi, Bluetooth, RF, or the like. The signal may be sent when the robotic device is ready for the refuse collection vehicle to collect the refuse in the container of the robotic device, if refuse collection is not required at a particular time, to notify the entity or collection vehicle of the day and time refuse collection is required, etc. In some embodiments the entity responsible for managing the collection of refuse may be an autonomous control system of specialized computing device or may be an operator. FIGS. 4A-E illustrate an example of steps that may be taken by an entity responsible for the collection of refuse from refuse containers of robotic devices. In FIG. 4A robotic device 401 receives a signal 402 from the entity responsible for collection of refuse, in this example the entity being refuse pickup truck 403. After receiving this signal, robotic device 401 in FIG. 4B drives itself to refuse pickup truck 403. In FIG. 4C robotic device 401 is then picked up and the refuse is dumped into refuse pickup truck 403. In FIG. 4D robotic device 401 is returned to the ground by refuse pickup truck 403 after the refuse is dumped inside refuse pickup truck 403. In FIG. 4E robotic device 401 travels back to its storage location (not shown) after the refuse has been emptied or once refuse pickup truck 403 has sent a signal to the robotic device 401 to return to its storage location. In this example, the robotic device travels to the refuse pickup truck, however, in alternative embodiments the refuse pickup truck may grab the robotic device from the curb utilizing an arm of the pickup truck. Other embodiments are also possible. The figures represented in these steps are not intended to be limiting or exclusive in nature.

In some embodiments, the robotic device may display a status of the robotic device on an interface of the robotic device or any other device paired with the robotic device or may send a status of the robotic device to an application of a communication device paired with the robotic device to provide a user with the status of the robotic device. Communication devices may include, but are not limited to, mobile phone, laptop, tablet, desktop computer, and the like. In other embodiments, the status of the robotic device may be communicated using audio or visual. Examples of statuses and/or messages may include, but is not limited to, parked at refuse container storage location, in route to refuse collection location, parked at the refuse collection location, refuse collection complete, refuse collection delayed, refuse collection incomplete, in route to refuse container storage location, stuck, collision with obstruction, damaged, container cleaning required, level of refuse within the refuse container and the like. In some embodiments, the robotic device may comprise sensors that can measure or detect the amount of refuse within the refuse container.

In some embodiments, the refuse container of the robotic device may be located in a public location and used as a public refuse container. In such embodiments, the robotic device may be a part of a continuous system, wherein a first robotic device with refuse container may be replaced by a second robotic device with refuse container when the first refuse container becomes full and/or the robotic device requires charging and the robotic device leaves its post location to empty the refuse container and/or to recharge. An example of a description of this type of continuous refuse container system may be found in U.S. Patent App. No. 62/616,669, the entirety of which are hereby incorporated by reference. In some embodiments, a robotic device may leave its post location, offload a full refuse container and reload an empty refuse container and return back to its post location.

In some embodiments, the container and the chassis of the robotic device may be two separate components. In some embodiments, the chassis of the robotic device may comprise a multipurpose transportation platform device that may support and transport various types of objects, including refuse containers. In some embodiments, the chassis may further comprise a locking mechanism for locking an object to be transported to the platform such that it remains static during transportation. In some embodiments, the chassis and refuse container may connected such that the refuse container may be locked into the chassis. In some embodiments, the refuse container may comprise internal and/or external sensors that when connected with the chassis are provided with electrical power. The processor of the robotic device may use the information gathered by the sensors of the refuse container for operating in the working environment or optimization purposes.

In some embodiments, the robotic device may comprise large bouncy wheels that may be used in overcoming obstacles. In some embodiments, the robotic device may comprise a suspension system, such as for example the suspension system described in U.S. patent application Ser. No. 15/951,096, the entirety of which are hereby incorporated by reference. In other embodiments, the robotic device may comprise mecanum wheels, such as for example those described in U.S. Patent App. No. 62/664,389, and Ser. No. 15/447,450, the entirety of which are hereby incorporated by reference.

In some embodiments, the battery of the robotic device may be charged by directly plugging into a socket, or by connecting with a charging station. In some embodiments, the battery of the robotic device may be charged by connecting with a charging station that is powered using solar energy. In some embodiments, the robotic device may comprise solar panels and may be powered using solar energy.

Figure 5:
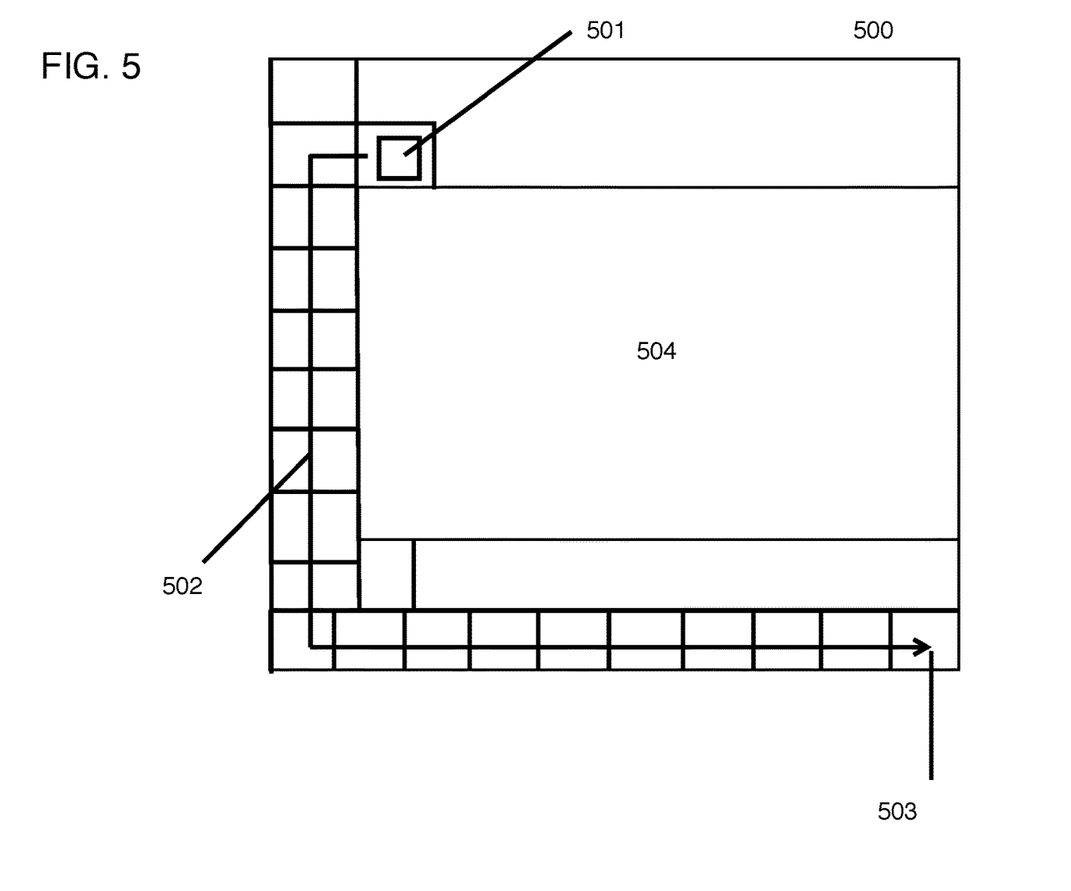
FIG. 5 illustrates an example of a user interface used for choosing a path of a robotic device.

In some embodiments, a user may choose or modify a path of the robotic device using, for example, an application of a communications device. Communication devices may include, but are not limited to, mobile phones, laptops, tablets, desktop computers, and the like. FIG. 5 illustrates an example of a user interface 500 displaying a map 504 of an environment such as a home of a user. Robotic device with internal refuse container (not shown) is located at storage location 501 near the back of the home as shown on map 504. A user may select a path 502 of robotic device with refuse container ending at refuse pickup location 503. A user may select the path by, for example, drawing the path on the map. If during operation an unexpected error occurs while traveling on the path selected by the user, the robotic device may alert the user to the issue, wherein after the user may select a different path or the robotic device may autonomously modify the path.

In some embodiments, an application of a communications device, including but not limited to, a mobile phone, laptop, desktop computer, or the like, may be used to transmit an image captured by a camera of the communications device to a processor of the robotic device for the purpose of selecting and commanding the location for the robotic device to travel to and/or perform work functions in.

The robotic device will extrapolate features of a work environment captured in an image in order to determine where the user wishes for the robotic device to travel to.

The foregoing descriptions of specific embodiments of the invention have been presented for purposes of illustration and description. They are not intended to be exhaustive or to limit the invention to the precise forms disclosed.

The invention claimed is:

1. An autonomous robot, comprising:
a chassis including a set of wheels;
a motor for driving the set of wheels;
a suspension system;
a rechargeable battery for providing power to the robot;
a control system module for controlling the movement of the robot;
a processor;
a set of sensors; and
a memory storing instructions that when executed by the processor effectuates operations comprising:
    capturing, by an image sensor positioned on the robot, images of an environment of the robot as the robot navigates within the environment;
    generating, by the processor, a map of the environment based on at least the images;
    determining, by the processor, a path of the robot from a current location to a second location;
    actuating, by the processor, the robot to autonomously drive along the path;
    receiving, by the processor, a schedule for emptying refuse stored in a container of the robot at a refuse collection location from an application of a communication device, wherein the schedule comprises a day, a time, a frequency, and a duration of time for remaining at the refuse collection location; and
    actuating, by the processor, the robot to navigate to the refuse collection location at the set schedule.

2. The robot of claim 1, further comprising a refuse container including a lid for storing refuse.

3. The robot of claim 1, wherein the set of sensors comprises at least one of a sensor for monitoring an amount of refuse within a refuse container of the robot and a sensor for monitoring the cleanliness of the refuse container.

4. The robot of claim 1, wherein the path is determined based on a number of collisions previously observed during operation, a travel time, a number of robot stalls previously observed during operation, and a travel distance.

5. The robot of claim 1, wherein the operations further comprise:
    transmitting, by the processor, a status of the robot to an application of a communication device, wherein the status of the robot comprises any of parked at refuse container storage location, in route to refuse collection location, parked at the refuse collection location, refuse collection complete, refuse collection delayed, refuse collection incomplete, in route to refuse container storage location, stuck, collision with obstruction, damaged, container cleaning required, and a level of refuse within the refuse container.

6. The robot of claim 1, wherein the operations further comprise:
    receiving, by the processor, any of operational commands and movement commands from an application of a communication device; and
    actuating, by the processor, the robot to execute the commands.

7. The robot of claim 1, wherein the operations further comprise:
    receiving, by the processor, a path of the robot from a first location to a second location from an application of a communication device; and
    actuating, by the processor, the robot to execute the path.

8. The robot of claim 1, wherein the operations further comprise:
    activating path learning when located at a storage location;
    moving along a path from the storage location to a refuse collection location while mapping the surroundings using data from the set of sensors and the images;
    deactivating path learning when located at the refuse collection location;
    activating path learning when at the refuse collection location;
    moving along a path from the refuse collection location to the storage location while mapping the surroundings using data from the set of sensors and the images; and
    deactivating path learning when at the storage location.

9. The robot of claim 1, wherein the operations further comprise:
    marking, by the processor, at least one observed obstacle in the map.

10. The robot of claim 1, wherein the operations further comprise:
    determining, by the processor, an obstacle type of an observed obstacle based on extracted features of the observed obstacle and a database of obstacles;
    marking, by the processor, the obstacle type in the map; and
    determining, by the processor, an alternate path that maneuvers around the observed obstacle.

11. The robot of claim 1, wherein the operations further comprise:
    determining, by the processor, a likelihood of encountering a particular obstacle type in a particular location within the environment; and
    determining, by the processor, high traffic areas within the environment based on obstacles observed, wherein high traffic areas comprise areas with a high number of obstacles present; and
    marking, by the processor, the high traffic areas within the map.

12. The robot of claim 1, wherein the current location is a storage location of the robot and the second location is a refuse collection location.

13. The robot of claim 12, wherein the robot autonomously transports itself to the refuse collection location at a predetermined time.

14. The robot of claim 12, wherein the robot autonomously transports itself to the refuse collection location upon receiving an instruction from an entity responsible for managing the collection of refuse.

15. The robot of claim 12, wherein the robot autonomously returns to the storage location after refuse collection at the refuse collection location is complete.

16. The robot of claim 1, wherein the processor generates multiple maps.

17. The robot of claim 16, wherein the operations further comprise:
    combining, by the processor, at least two maps to generate a larger map of the environment.

18. The robot of claim 1, wherein the robot belongs to a system of robots operating in collaboration.

19. The robot of claim 18, wherein:
    the robot is an autonomous refuse container robot positioned within the environment; and a second autonomous refuse container robot replaces the autonomous refuse container robot when any of its refuse container is full and its battery level is below a threshold amount.

* * * * *